US011228206B2

(12) United States Patent
Lee et al.

(10) Patent No.: US 11,228,206 B2
(45) Date of Patent: Jan. 18, 2022

(54) WIRELESS POWER TRANSMITTER, WIRELESS POWER RECEIVER, AND CONTROL METHODS THEREOF

(71) Applicant: SAMSUNG ELECTRONICS CO., LTD., Suwon-si (KR)

(72) Inventors: Kyung-Woo Lee, Seoul (KR); Kang-Ho Byun, Gyeonggi-do (KR); Seho Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/031,951

(22) Filed: Sep. 25, 2020

(65) Prior Publication Data

US 2021/0013745 A1    Jan. 14, 2021

Related U.S. Application Data

(63) Continuation of application No. 14/155,922, filed on Jan. 15, 2014, now Pat. No. 10,790,701.

(30) Foreign Application Priority Data

Jan. 15, 2013  (KR) .................. 10-2013-0004350
Mar. 28, 2013  (KR) .................. 10-2013-0033917
May 10, 2013  (KR) .................. 10-2013-0053452

(51) Int. Cl.
*H02J 50/10*     (2016.01)
*H02J 50/40*     (2016.01)
(Continued)

(52) U.S. Cl.
CPC .......... *H02J 50/10* (2016.02); *H02J 7/00034* (2020.01); *H02J 50/12* (2016.02); *H02J 50/40* (2016.02);
(Continued)

(58) Field of Classification Search
CPC .. H02J 50/10; H02J 50/12; H02J 50/40; H02J 50/60; H02J 50/80; H02J 2007/0096; H02J 7/00034; H04B 5/0031; H04B 5/0037
(Continued)

(56) References Cited

U.S. PATENT DOCUMENTS 10,790,701  B2    9/2020  Lee et al.
2007/0216392 A1    9/2007  Stevens et al.
(Continued)

FOREIGN PATENT DOCUMENTS

JP    2007-537688    12/2007
JP    2009-131039    6/2009
(Continued)

OTHER PUBLICATIONS

U.S. Appl. No. 14/155,922 filed Jan. 15, 2014; Lee et al.
(Continued)

*Primary Examiner* — Edward Tso
*Assistant Examiner* — Aaron Piggush
(74) *Attorney, Agent, or Firm* — Nixon & Vanderhye P.C.

(57) ABSTRACT

A wireless power transmitter and method are provided for transmitting charging power to a wireless power receiver. The method includes transmitting, to the wireless power receiver, a control signal including first time information and load change information; detecting a load change of the wireless power receiver during a period of time corresponding to the first time information; and determining that the wireless power receiver is authorized for charging, if the detected load change of the wireless power receiver corresponds to the load change information included in the control signal.

16 Claims, 11 Drawing Sheets

(51) Int. Cl.
  *H02J 50/80* (2016.01)
  *H02J 50/12* (2016.01)
  *H04B 5/00* (2006.01)
  *H02J 7/00* (2006.01)

(52) U.S. Cl.
  CPC .......... *H02J 50/80* (2016.02); *H04B 5/0031* (2013.01); *H04B 5/0037* (2013.01)

(58) Field of Classification Search
  USPC .................................. 320/108, 155; 307/104
  See application file for complete search history.

(56) References Cited

U.S. PATENT DOCUMENTS

| | | | |
|---|---|---|---|
| 2008/0065270 | A1 | 3/2008 | Kasztenny et al. |
| 2009/0133942 | A1 | 5/2009 | Ilsaka et al. |
| 2009/0322158 | A1* | 12/2009 | Stevens .................. H02J 50/10 307/104 |
| 2010/0036773 | A1 | 2/2010 | Bennett |
| 2010/0248622 | A1 | 9/2010 | Lyell Kirby et al. |
| 2011/0140538 | A1 | 6/2011 | Jung et al. |
| 2011/0225305 | A1 | 9/2011 | Vedantham et al. |
| 2011/0260549 | A1 | 10/2011 | Jung et al. |
| 2011/0260682 | A1 | 10/2011 | Low |
| 2012/0205988 | A1 | 8/2012 | Tanabe |
| 2012/0214536 | A1 | 8/2012 | Kim |
| 2012/0223589 | A1 | 9/2012 | Low |
| 2012/0293007 | A1 | 11/2012 | Byun et al. |
| 2012/0329405 | A1 | 12/2012 | Lee et al. |
| 2013/0181665 | A1* | 7/2013 | Lee .......................... H02J 50/40 320/108 |
| 2013/0293028 | A1 | 11/2013 | Byun |
| 2014/0159653 | A1* | 6/2014 | Von Novak .......... H04B 5/0031 320/108 |

FOREIGN PATENT DOCUMENTS

| | | |
|---|---|---|
| JP | 2010-028934 | 2/2010 |
| JP | 2010-178473 | 8/2010 |
| JP | 2012-511891 | 5/2012 |
| JP | 2012-522483 | 9/2012 |
| JP | 2016-504007 | 2/2016 |
| KR | 10-2012-0128099 | 11/2012 |
| KR | 10-2012-0128554 | 11/2012 |
| KR | 10-2012-0128570 | 11/2012 |
| WO | WO 2009/140217 | 11/2009 |
| WO | WO 2012/108663 | 8/2012 |
| WO | WO 2014/093160 | 6/2014 |

OTHER PUBLICATIONS

European Search Report dated Mar. 3, 2017 issued in counterpart application No. 14151301.0-1804; 8 pgs.
Alliance for Wireless Power, A4WP Wireless Power Transfer System Baseline System Specification (BSS), Final Approved Specification, Jan. 2, 2013, pp. 102.
Japanese Office Action dated Oct. 30, 2017 issued in counterpart application No. 2015-552590, 12 pgs.
Korean Office Action dated Nov. 28, 2017 issued in counterpart application No. 10-2013-0053452, 8 pgs.
Japanese Office Action dated Feb. 9, 2018 issued in counterpart application No. 2015-552590, 6pgs.

* cited by examiner

WIRELESS POWER TRANSMITTER, WIRELESS POWER RECEIVER, AND CONTROL METHODS THEREOF

PRIORITY

This application is a continuation of application Ser. No. 14/155,922, filed Jan. 15, 2014 (now U.S. Pat. No. 10,790,701), which claims priority to Korean Patent Application No. 10-2013-0004350, filed Jan. 15, 2013, Korean Application No. 10-2013-0033917, filed Mar. 28, 2013 and Korean Application No. 10-2013-0053452, filed May 10, 2013, the entire contents of which are all hereby incorporated herein by reference in their entireties.

BACKGROUND

1. Field of the Invention

The present invention relates generally to a wireless power transmitter and a wireless power receiver, and control methods thereof, and more particularly, to a wireless power transmitter, a wireless power receiver, and method of communication therebetween.

2. Description of the Related Art

Mobile terminals, such as a mobile phone, a Personal Digital Assistant (PDA), etc., are powered by rechargeable batteries. Commonly, the battery of the mobile terminal is charged through supplied electrical energy using a separate charging apparatus. For example, a separate contact terminal electrically connects the charging apparatus and the battery to each other.

However, because the contact terminal typically protrudes outward, the contact terminal is often contaminated by foreign substances or damaged due to moisture, which inhibits proper charging.

Wireless charging (or a non-contact charging) has been developed in an effort to address the above-mentioned problems.

Wireless charging uses wireless power transmission and reception. For example, wireless charging is used in a system in which a battery can be automatically charged, when the battery is laid on a charging pad, without having to physically connect the mobile phone or battery to a separate charging connector.

The wireless charging typically utilizes an electromagnetic induction scheme using coils, a resonance scheme using a resonance, or a Radio Frequency (RF)/microwave radiation scheme that converts electrical energy to microwaves and then transmits the microwaves.

Power transmission through electromagnetic induction transmits power between a first coil and a second coil. More specifically, when a magnet approaches the first coil, an induced current is generated. A transmission side generates a magnetic field using the induced current and a reception side generates energy through an induced current according to changes in the magnetic field. This phenomenon is referred to as magnetic induction, and the power transmission method using magnetic induction has a high energy transmission efficiency.

Power transmission through the resonance scheme is based on a coupled mode theory and may charge a battery of a device that is separated from a charging device by several meters. More specifically, an electromagnetic wave is resonated, which includes electrical energy instead of resonating sounds. The resonated electrical energy is directly transferred to a device having a corresponding resonance frequency. Accordingly, electrical energy that is not used is reabsorbed into an electromagnetic field, instead of being spread in the air. As a result, the electrical energy in the resonance scheme does not affect surrounding machines or people, unlike other electromagnetic waves.

A wireless power transmitter and a wireless power receiver may communicate using various schemes, for example, a Zig-Bee scheme or a Bluetooth low energy scheme, By an out-band scheme such as the Zig-Bee scheme or the Bluetooth low energy scheme, an available distance of communication increases. Accordingly, even when the wireless power transmitter and the wireless power receiver are located a relatively far distance from each other, the wireless power transmitter and the wireless power receiver may still perform the communication. That is, the wireless power transmitter may perform communication with the wireless power receiver even though the wireless power transmitter is located farther than a distance for which wireless power generally cannot be transmitted.

FIG. 1 is a diagram illustrating a concept of cross-connection.

Referring to FIG. 1, a first wireless power receiver RX1 is located near a first wireless power transmitter TX1, and a second wireless power receiver RX2 is located near a second wireless power transmitter TX2. The first wireless power transmitter TX1 transmits power to the first wireless power receiver RX1 and the second wireless power transmitter TX2 transmits power to the second wireless power receiver RX2. Accordingly, the first wireless power transmitter TX1 communicates with the first wireless power receiver RX1 and the second wireless power transmitter TX2 communicates with the second wireless power receiver RX2.

However, if the first wireless power receiver RX1 is moved away from the first wireless power transmitter TX1, the first wireless power receiver RX1 may enter a wireless power network controlled by the second wireless power transmitter TX2. Similarly, if the second wireless power receiver RX2 is moved away from the second wireless power transmitter TX2, the second wireless power receiver RX2 may enter a wireless power network controlled by the first wireless power transmitter TX1. This commonly called a cross-connection.

During the cross-connection, a problem may occur when the first wireless power transmitter TX1 transmits power requested by the second wireless power receiver RX2, not power requested by the first wireless power receiver RX1. For example, when a capacity of the second wireless power receiver RX2 is greater than that of the first wireless power receiver RX1, over capacity power may be applied to the first wireless power receiver RX1, which causes a problem.

Further, when the capacity of the second wireless power receiver RX2 is smaller than that of the first wireless power receiver RX1, a problem may occur in which the first wireless power receiver RX1 receives less power than its actual charging capacity.

SUMMARY

Accordingly, the present invention is designed to address at least the above-described problems and/or disadvantages and to provide at least the advantages described below.

An aspect of the present invention is to address problems associated with a cross-connection.

Another aspect of the present invention is to provide a wireless power transmitter and method for excluding a wireless power receiver that is cross connected.

In accordance with an aspect of the present invention, a method is provided for controlling a wireless power transmitter to transmit charging power to a wireless power receiver. The method includes transmitting, to the wireless power receiver, a control signal including first time information and load change information; detecting a load change of the wireless power receiver during a period of time corresponding to the first time information; and determining that the wireless power receiver is authorized for charging, if the detected load change of the wireless power receiver corresponds to the load change information included in the control signal.

In accordance with another aspect of the present invention, a wireless power transmitter is provided for transmitting charging power to a wireless power receiver. The wireless power transmitter includes a communication unit configured to transmit a control signal including first time information and load change information to the wireless power receiver; a controller configured to detect a load change of the wireless power receiver during a period of time corresponding to the first time information, and to determine that the wireless power receiver is authorized for charging, if the detected load change of the wireless power receiver corresponds to the load change information included in the control signal; and a power transmitting unit configured to apply the charging power to the wireless power receiver authorized for charging.

In accordance with another aspect of the present invention, a method is provided for controlling a wireless power receiver to receive charging power from a wireless power transmitter. The control method includes receiving, from the wireless power transmitter, a control signal including first time information and load change information; changing a load state according to the load change information, during a period of time corresponding to the first time information; and returning the load state back to a previous state before the changing, after a lapse of the period of time corresponding to the first time information.

In accordance with another aspect of the present invention, a wireless power receiver is provided for receiving charging power from a wireless power receiver. The wireless power receiver includes a communication unit configured to receive a control signal including first time information and load change information from the wireless power transmitter; a charging unit configured to charge the wireless power receiver at the charging power received from the wireless power transmitter; a load switch configured to switch a connection state of the charging unit to be in an on or off state; and a controller configured to controlling the load switch to be changed into the on state during a period of time corresponding to the first time information, based on the load change information.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
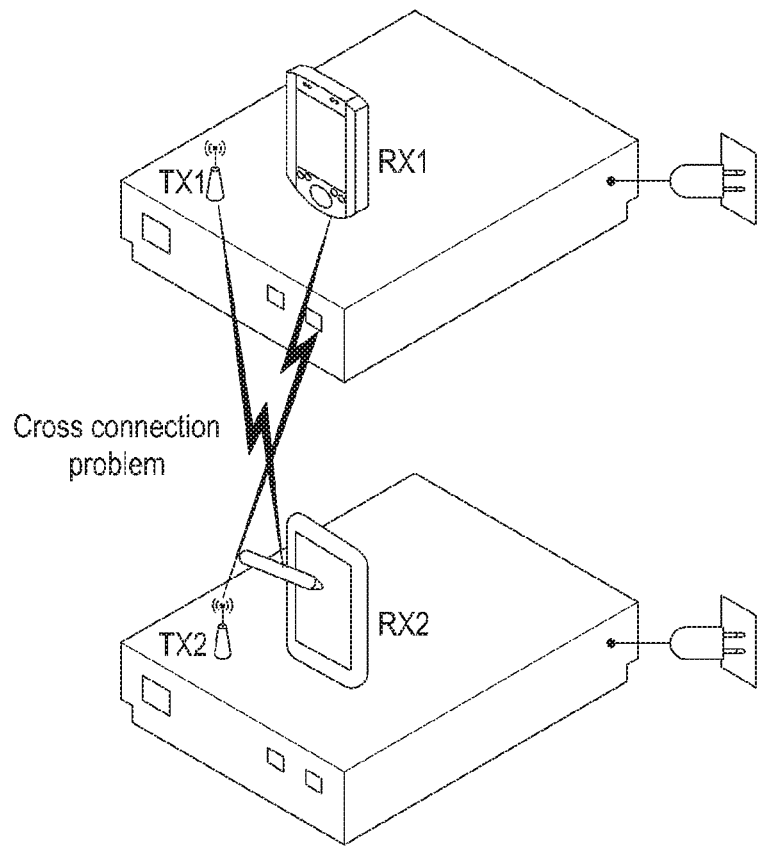
FIG. 1 is a diagram illustrating a concept of cross-connection.
Figure 2:
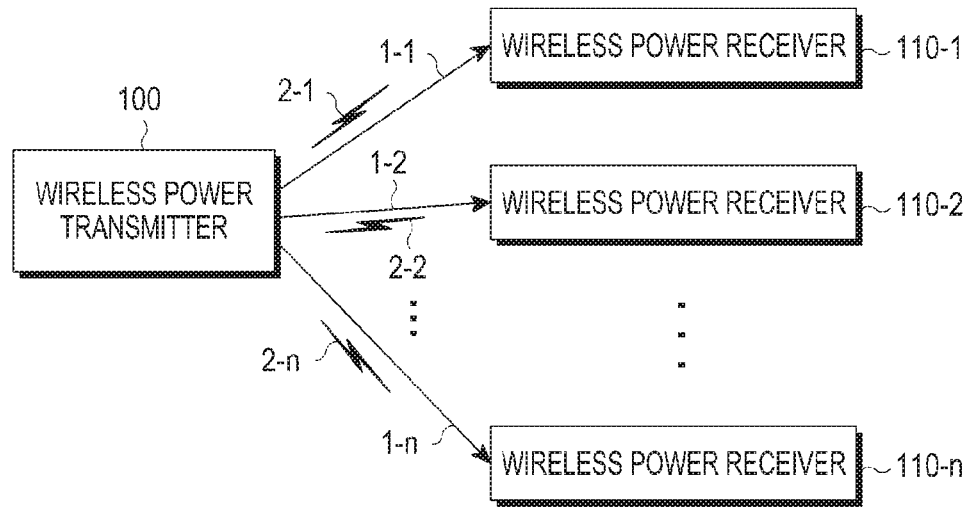
FIG. 2 illustrates a wireless charging system operation according to an embodiment of the present invention.

FIG. 2 illustrates a wireless charging system operation according to an embodiment of the present invention.

Referring to FIG. 2, a wireless charging system includes a wireless power transmitter 100 and a plurality of wireless power receivers, e.g., wireless power receivers 110-1, 110-2, and 110-n.

The wireless power transmitter 100 may wirelessly transmit power 1-1, 1-2, and 1-n to the wireless power receivers 110-1, 110-2, and 110-3, respectively. More specifically, the wireless power transmitter 100 may wirelessly transmit the power 1-1, 1-2, and 1-n to an authenticated wireless power receiver.

The wireless power transmitter 100 configures an electrical connection with the wireless power receivers 110-1, 110-2, and 110-n. For example, the wireless power transmitter 100 transmits wireless power in an electromagnetic wave type to the wireless power receivers 110-1, 110-2, and 110-n.

The wireless power transmitter 100 performs bidirectional communication with the wireless power receivers 1104, 110-2, and 110-n. Here, the wireless power transmitter 100 and the wireless power receivers 110-1, 110-2, and 110-n process, transmit, and/or receive packets 2-1, 2-2, and 2-*n* including predetermined frames. The frames will be described below in more detail. For example, the wireless power receiver may be implemented by a mobile communication terminal, a PDA, a Personal Media Player (PMP), a smart phone, etc.

The wireless power transmitter 100 wirelessly provides power to a plurality of wireless power receivers 110-1, 110-2, and 110-*n*. For example, the wireless power transmitter 100 transmits power to the plurality of wireless power receivers 110-1, 110-2, and 110-*n* through a resonant scheme. Using the resonant scheme, distances between the wireless power transmitter 100 and the plurality of wireless power receivers 110-1, 110-2, and 110-*n* should be no more than approximately 30 m. However, when the wireless power transmitter 100 uses an electromagnetic induction scheme, the distances between the wireless power transmitter 100 and the plurality of wireless power receivers 110-1, 110-2, and 110-*n* should be no more than approximately 10 cm.

The wireless power receivers 110-1, 110-2, and 110-*n* receive wireless power from the wireless power transmitter 100 and charge batteries therein using the received power.

Further, each of the wireless power receivers 110-1, 110-2, and 110-*n* may transmit, to the wireless power transmitter 100, a signal requesting wireless power transmission, information used for wireless power reception, state information of the wireless power receiver, and/or control information of the wireless power transmitter 100.

Further, each of the wireless power receivers 110-1, 110-2, and 110-*n* transmit a message indicating its respective charging state to the wireless power transmitter 100.

The wireless power transmitter 100 may include a display, which displays a state of each of the wireless power receivers 110-1, 110-2, and 110-*n* based on the messages received from each of the wireless power receivers 110-1, 110-2, and 110-*n*. Further, the wireless power transmitter 100 may also display charging times associated with the wireless power receivers 110-1, 110-2, and 110-*n*. For example, the wireless power transmitter 100 may display an approximate remaining charging time for each of the 25 wireless power receivers 110-1, 110-2, and 110-*n*.

The wireless power transmitter 100 may transmit a control signal for disabling a wireless charging function to each of the wireless power receivers 110-1, 110-2, and 110-*n*. The wireless power receivers 110-1, 110-2, and 110-*n* having received a disable control signal of the wireless charging function from the wireless power transmitter 100 disable the wireless charging function.

Figure 3A:
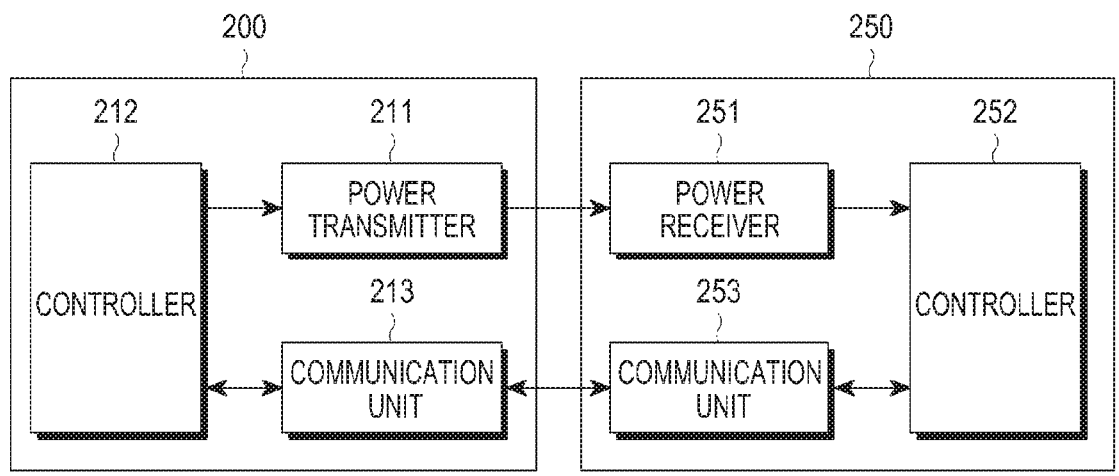
FIG. 3A illustrates a wireless power transmitter and a wireless power receiver according to an embodiment of the present invention.

FIG. 3A illustrates a wireless power transmitter and a wireless power receiver according to an embodiment of the present invention.

Referring to FIG. 3A, a wireless power transmitter 200 includes a power transmitter 211, a controller 212, and a communication unit 213. Further, a wireless power receiver 250 includes a power receiver 251, a controller 252, and a communication unit 253.

The power transmitter 211 provides power required by the wireless power transmitter 200 and wirelessly provides the power to the wireless power receiver 250. For example, when the power transmitter 211 receives power in an Alternating Current (AC) waveform type, e.g., from an electrical outlet, it may directly supply power in the AC waveform type. However, when the power transmitter 211 receives power in a Direct Current (DC) waveform type, it first converts the received DC waveform type power, to finally supply the power in the AC waveform type.

For example, the power transmitter 211 may be implemented in the form of a battery included in the wireless power transmitter 200, i.e., it may be part of a battery, or may be implemented in the form of a power reception interface, as a component of the wireless power transmitter 200, to receive power from a battery or other source, such as an electrical outlet. It should be easily understood by those ordinarily skilled in the art that structure of the power transmitter 211 has no limitation as long as the power transmitter 21 is capable of providing AC waveform type power.

Further, the power transmitter 211 provides the AC waveform in an electromagnetic wave to the wireless power receiver 250. The power transmitter 211 may include a loop coil for transmitting and receiving an electromagnetic wave. When the power transmitter 211 is implemented by the loop coil, inductance L of the loop coil may change. The power transmitter 211 is not limited to the description above and may be embodied differently, as long as the power transmitter 211 is capable of transmitting and receiving the electromagnetic wave.

The controller 212 controls the overall operation of the wireless power transmitter 200, e.g., ley using an algorithm, a program, or an application read from a storage unit (not shown). The controller 212 may be implemented in a form of a CPU, a microprocessor, or a mini computer.

The communication unit 213 communicates with the wireless power receiver 250. For example, the communication unit 213 may communicate with the communication unit 253 of the wireless power receiver 250 using Near Field Communication (NFC), ZigBee communication, infrared communication, visible ray communication, etc. Herein, it is assumed that the communication unit 213 communicates using ZigBee communication of IEEE802.15.4, and uses a Carrier Sense Multiple Access with a Collision Avoidance (CSMA/CA) algorithm, although the present invention is not limited thereto.

The communication unit 213 transmits a signal including information about the wireless power transmitter 200. For example, the communication unit 213 may unicast, multicast, or broadcast the signal.

Table 1 shows a frame data structure of a signal, i.e., a notice signal, transmitted from the wireless power transmitter 200 according to an embodiment of the present invention. Herein, the wireless power transmitter 200 periodically transmits the notice signal.

TABLE 1

| Frame type | Protocol version | Sequence number | Network ID | RX to Report (schedule mask) | Reserved | Number of Rx |
|---|---|---|---|---|---|---|
| Notice | 4 bit | 1 Byte | 1 Byte | 1 Byte | 5 bit | 3 bit |

In Table 1, the frame type field indicates a type of the frame, i.e., a notice signal frame. The protocol version field indicates a type of protocol and is allocated, for example, 4 bits. The sequence number field indicates a sequential order of the fame and is allocated, for example, 1 byte. For example, the sequence number may increase by one for each signal transmission/reception step.

The network IDentifier (ID) field indicates a network ID of the wireless power transmitter 200 and is allocated, for example, 1 byte. An Rx to Report (schedule mask) field indicates wireless power receivers for providing a report to the wireless power transmitter 200 and is allocated, for example, 1 byte.

Table 2 shows the Rx to Report (schedule mask) field according to an embodiment of the present invention.

TABLE 2

| Rx to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 correspond to first to eighth wireless power receivers, respectively. The Rx to Report (schedule mask) field is implemented such that the wireless power receiver having a schedule mask number of 1 provides a report.

Referring back to Table 1, the reserved field is reserved for being used in the future and is allocated, for example, 5 bytes. The number of Rx field indicates the number of wireless power receivers located near the wireless power transmitter 200 and is allocated, for example, 3 bits.

A signal having the frame type as shown in Table 1 may be allocated to Wireless Power Transmission (WPT) of a data structure in an IEEE802.15.4 form.

Table 3 shows a data structure of IEEE802.15.4.

TABLE 3

| Preamble | SFD | Frame Length | WPT | CRC16 |
|---|---|---|---|---|

As shown in Table 3, the data structure of IEEE802.15.4 includes a Preamble field, a Start Frame Delimiter (STD) field, a Frame Length field, a WPT field, and a Cyclic Redundancy Check (CRC) 16 field. For example, the data structure shown in Table 1 may be included in the WPT field shown in Table 3.

The communication unit 213 receives power information from the wireless power receiver 250. For example, the power information may include at least one of a capacity, a residual quantity of the battery, the number of times of charging, a usage quantity, a battery capacity, and a battery ratio of the wireless power receiver 250. Further, the communication unit 213 transmits a charging function control signal for controlling a charging function of the wireless power receiver 250. The charging function control signal is a control signal controls the power receiver 251 of the particular wireless power receiver 250 to enable or disable the charging function of the particular wireless power receiver 250.

The communication unit 213 may receive signals from another wireless power transmitter (not shown) as well as the wireless power receiver 250. For example, the communication unit 213 may receive the notice signal of Table 1 from another wireless power transmitter.

Although FIG. 3A illustrates the power transmitter 211 and the communication unit 213 as different hardware elements, the power transmitter 211 and the communication unit 213 may alternatively be implemented as a single hardware structure.

The wireless power transmitter 200 and the wireless power receiver 250 transmit and receive various types of signals. Accordingly, the wireless power receiver 250 may join a wireless power network controlled by the wireless power transmitter 200 and the charging process through the wireless power transmission and reception may be performed.

Figure 3B:
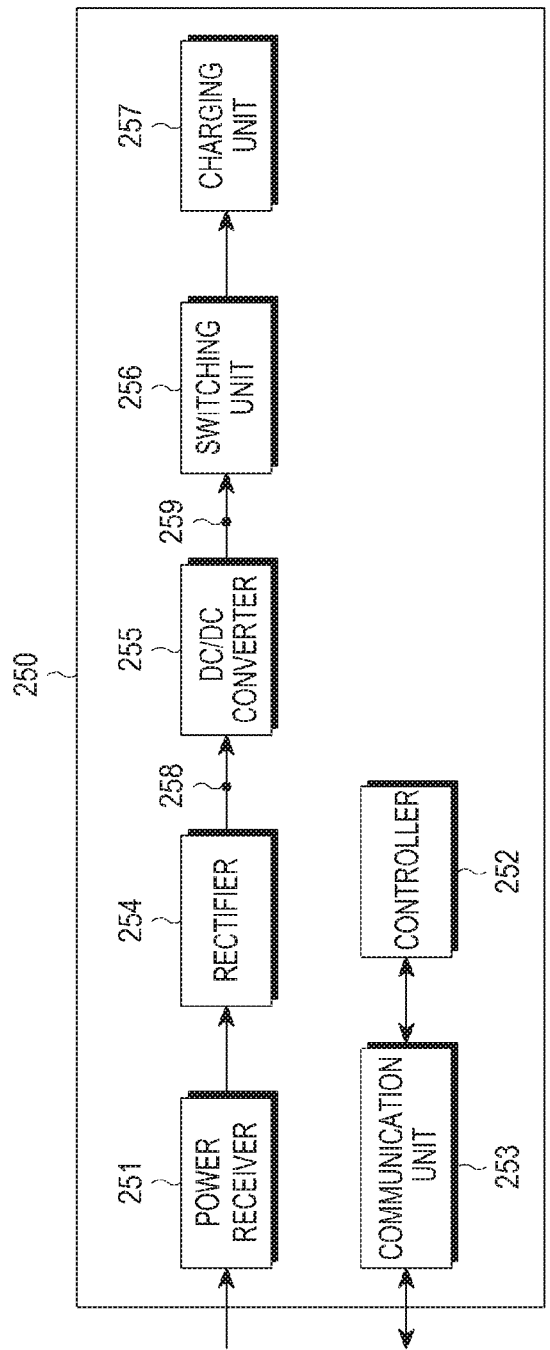
FIG. 3B illustrates a wireless power receiver according to an embodiment of the present invention.

FIG. 3B illustrates a wireless power receiver according to an embodiment of the present invention. Specifically, FIG. 3B illustrates a more detailed description of the wireless power receiver 250 illustrated in FIG. 3A.

Referring to FIG. 3B, the wireless power receiver 250 includes the power receiver 251, the controller 252, the communication unit 253, a rectifier 254, a DC/DC converter 255, a switching unit 256, and a charging unit 257.

Descriptions of the power receiver 251, the controller 252, and the communication unit 253 have been provided above with reference to FIG. 3A. Therefore, a repetitive description of these elements will be omitted here.

Referring to FIG. 3B, the rectifier 254 rectifies wireless power received from the power receiver 251 to DC power and may be implemented, for example, as a bridge diode type. The DC/DC converter 255 converts the rectified power to a preset gain. For example, the DC/DC converter 255 may convert the rectified power such that a voltage at an output terminal 259 becomes 5V. A minimum value and a maximum value of a voltage applied to a front end 258 of the DC/DC converter 255 may be preset, and the aforementioned information may be recorded in an input voltage MIN field and an input voltage MAX field of a request join signal, which will be described below. A rated voltage applied to the rear end 259 of the DC/DC converter 255 and a rated current flowing to the rear end 259 may be included in an output voltage field and a an output current field of the request join signal.

The switching unit 256 connects the DC/DC converter 255 with the charging unit 257. The switching unit 256 maintains an on/off state according to a control of the controller 252.

The charging unit 257 stores the converted power received from the DC/DC converter 255 when the switch unit 256 is in the on state.

The communication unit 253 receives the command signal for starting charging, and the control unit 252 controls the switch unit 256 to maintain an on state at the predetermined time based on the received command signal.

Figure 4:
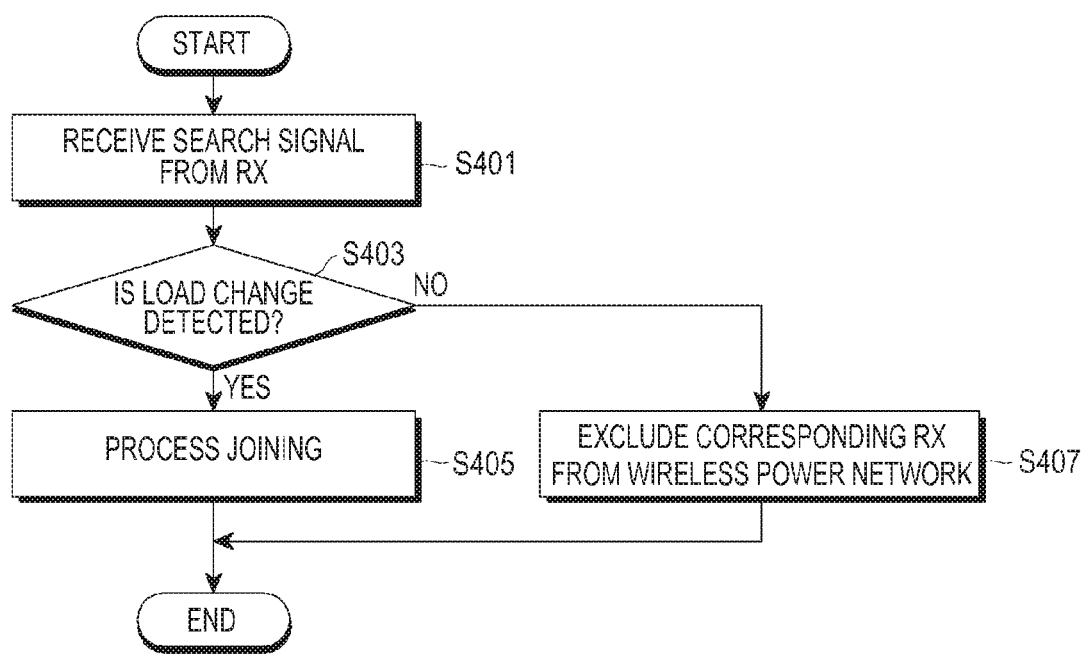
FIG. 4 is a flowchart illustrating a method of controlling a wireless power transmitter according to an embodiment of the present invention.

FIG. 4 illustrating a method for controlling a wireless power transmitter according to an embodiment of the present invention.

Referring to FIG. 4, the wireless power transmitter receives a wireless power transmitter search signal (hereinafter, referred to as a search signal) from the wireless power receiver in step S401. For example, the search signal has a data structure as shown in Table 4 below.

TABLE 4

| Frame Type | Protocol Version | Sequence Number | Company ID | Product ID | Impedance | Class |
|---|---|---|---|---|---|---|
| Search | 4 bit | 1 Byte | 1 Byte | 4 Byte | 4 bit | 4 bit |

In Table 4, the frame type field indicates a type of frame, i.e., a search frame. The protocol version field indicates a type of protocol of a communication scheme and is allocated, for example, 4 bits. The sequence number field indicates a sequential order of the corresponding signal and is allocated, for example, 1 byte. For example, the sequence number may increase by one for each signal transmission/reception step, That is, when the sequence number of the notice signal of Table 1 is 1, the sequence number of the search signal of Table 4 may be 2.

The company ID field indicates manufacturer information of the wireless power receiver and is allocated, for example, 1 byte. The product ID field indicates product information of the wireless power receiver and includes, for example, serial number information on the wireless power receiver. The product ID field is allocated, for example, 4 bytes. The impedance field indicates impedance information of the wireless power receiver and is allocated, for example, 4 bits. The class field indicates rated power information of the wireless power receiver and is allocated, for example, 4 bits.

In step S403, the wireless power transmitter detects whether there is a load change. When it is determined that there is the load change i.e., when the wireless power receiver having transmitted the search signal is disposed on the wireless power transmitter, the wireless power transmitter performs a process for joining the corresponding wireless power receiver to the wireless power network in step S405.

However, when no load change is detected in step S403, i.e., when the wireless power receiver having transmitted the search signal is not disposed on the wireless power transmitter, the wireless power transmitter excludes the corresponding wireless power receiver from the wireless power network in step S407.

Basically, when a wireless power receiver is disposed on the wireless power transmitter, a load or impedance at one point of the wireless power transmitter will changed. However, when the wireless power receiver is disposed on another wireless power transmitter, the load or impedance at the one point of the wireless power transmitter does not change. Accordingly, after receiving a search signal, the wireless power transmitter determines whether the wireless power receiver is disposed on the wireless power transmitter or another wireless power transmitter through the detection of the load change.

Figure 5:
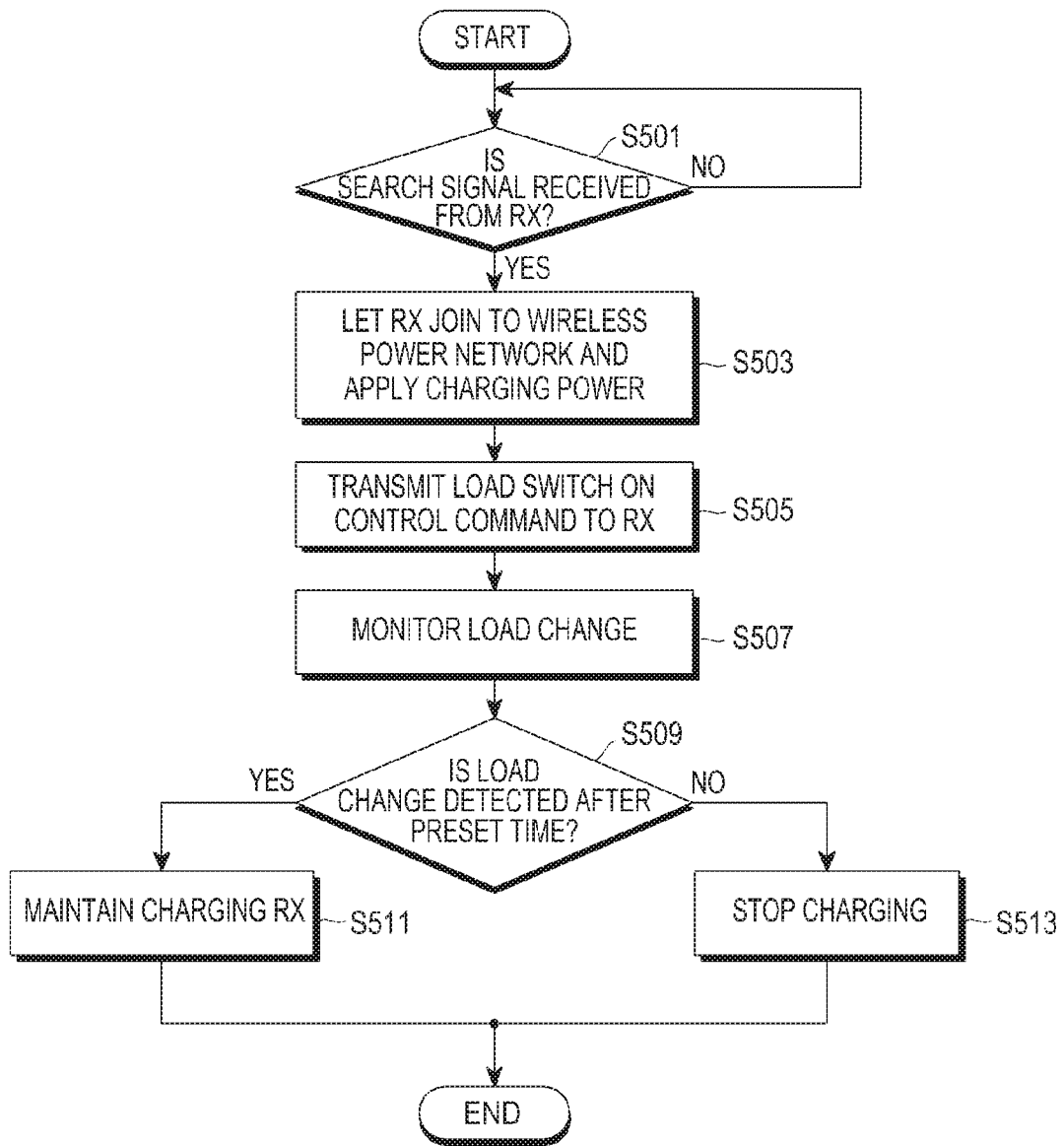
FIG. 5 is a flowchart illustrating a method of controlling a wireless power transmitter according to an embodiment of the present invention.

FIG. 5 is a flowchart illustrating a method or controlling a wireless power transmitter according to an embodiment of the present invention.

Referring to FIG. 5, the wireless power transmitter receives, for example, a search signal having a data structure as shown in Table 1 from the wireless power receiver in step S501.

In step S503, the wireless power transmitter lets the corresponding wireless power receiver join a wireless power network controlled by the wireless power transmitter and applies charging power to the joined wireless power receiver.

In step S505, the wireless power transmitter transmits a load switch on control command for controlling the wireless power receiver to control the load switch to switch to the on state. For example, the load switch may be connected to a charging unit, as illustrated in FIG. 3B.

In step S507, the wireless power transmitter monitors whether there is a load change. When the load switch is controlled to be in the on state, the load is connected to the wireless power receiver, and the load value at one point of the wireless power transmitter may be changed.

When the wireless power transmitter detects the load change in step S509, the wireless power transmitter identifies that the wireless power receiver is disposed on the wireless power transmitter, and continues to charge the wireless power receiver in step S511. However, when the wireless power receiver is disposed on a different wireless power transmitter, i.e., the wireless power transmitter does not detect the load change in step S509, the wireless power transmitter identifies that the wireless power receiver is disposed on another wireless power transmitter and stops charging the wireless power receiver in step S513.

For example, the wireless power transmitter may exclude the wireless power receiver from the wireless power network. Alternatively, the wireless power transmitter may transmit a network exclusion message to the wireless power receiver, and then the wireless power receiver may be excluded from the wireless power network based on the network exclusion message.

For example, when the wireless power transmitter is also supplying charging power to another wireless power receiver, the wireless power transmitter will only decrease the charging power for the wireless power receiver to be excluded, while maintaining the charging power for the other wireless power receiver.

Figure 6:
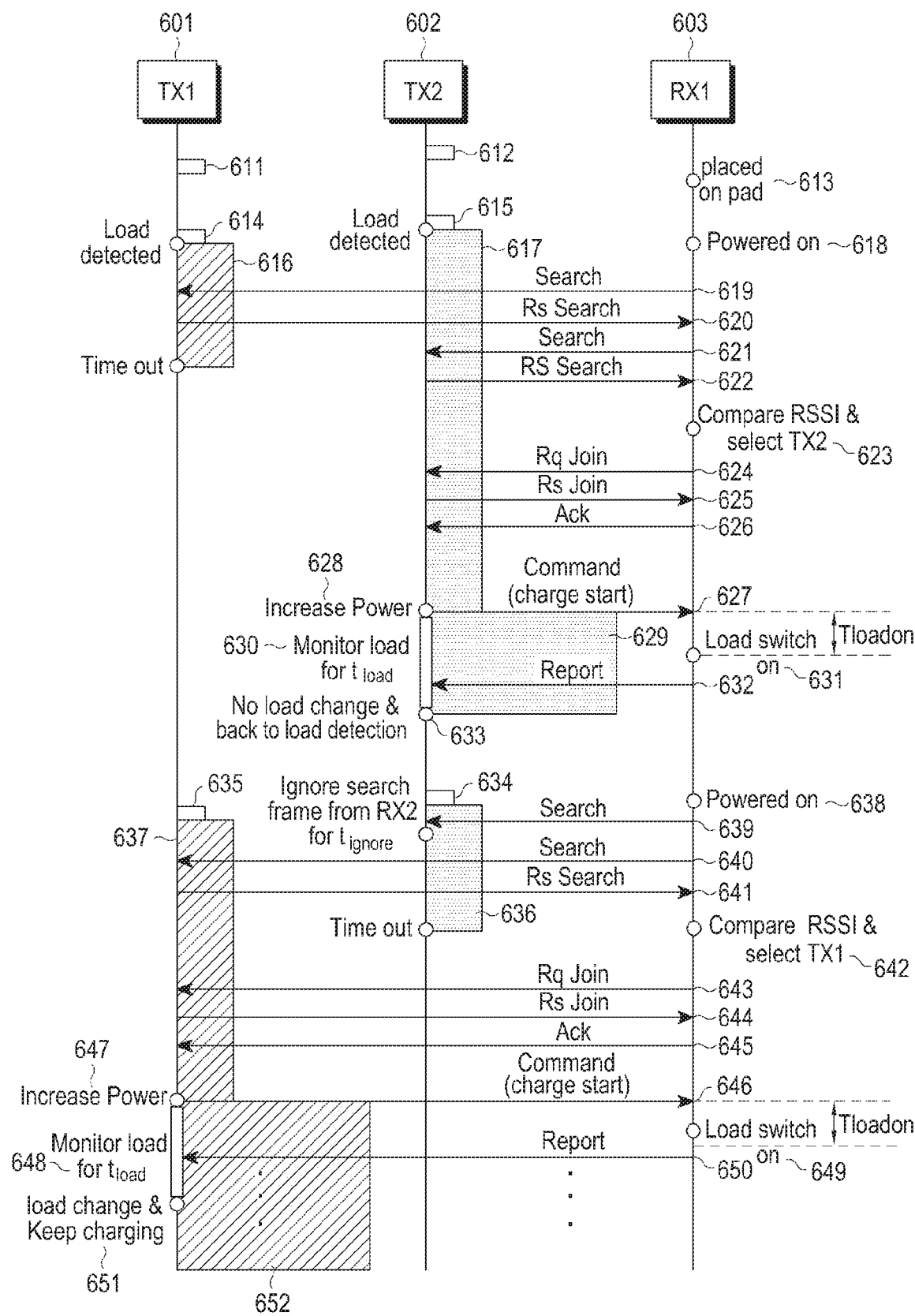
FIG. 6 is a signal flow diagram illustrating a charging process of a wireless power transmitter and a wireless power receiver according to an embodiment of the present invention.

FIG. 6 is a signal flow diagram illustrating a charging process of a wireless power transmitter and a wireless power receiver according to an embodiment of the present invention.

Referring to FIG. 6, a first wireless power transmitter 601 and a second wireless power transmitter 602 are available for supplying power, and a wireless power receiver 603 is disposed on the first wireless power transmitter 601. Further, the wireless power receiver 603 is located at a communicable distance from both the first wireless power transmitter 601 and the second wireless power transmitter 602. Further, both the first wireless power transmitter 601 and the second wireless power transmitter 602 can detect a load change based on the location of the wireless power receiver 603.

The first wireless power transmitter 601 periodically or aperiodically applies detection power 611 and 614 for detecting the wireless power receiver 603. The second wireless power transmitter 602 periodically or aperiodically applies detection power 612 and 615 for detecting the wireless power receiver 603. The detection power is power applied for detecting the wireless power receiver 603 by the first wireless power transmitter 601 or the second wireless power transmitter 602.

As described above, when the wireless power receiver 603 is disposed on one of the wireless power transmitters, a load or impedance at one point of the corresponding wireless power transmitter changes. The first wireless power transmitter 601 or the second wireless power transmitter 602 then detects the load change at the one point based on detection power, while applying the corresponding detection power.

In step 613, a user disposes the first wireless power receiver 603 on the first wireless power transmitter 601.

The first wireless power transmitter 601 detects the load change during a process of applying detection power 614. Thereafter, the first wireless power transmitter 601 stops applying the detection power 614 and applies driving power 616.

The second wireless power transmitter 602 also detects the load change during a process of applying the detection power 615. Thereafter, the second wireless power transmitter 602 stops applying the detection power 615 and applies driving power 617. Here, the driving power may have a power quantity for driving a controller or a. Micro Control Unit (MCU) of the wireless power receiver 603 or a power quantity for driving the controller or the MCU, and operating a communication module.

In step 619, the wireless power receiver 603 transmits a search signal, e.g., as shown in Table 1, based on the applied driving power 616 or 617. For example, the wireless power receiver transmits the search signal based on a multicast or a broadcast technique. Accordingly, both the first wireless power transmitter 601 and the second wireless power transmitter 602 receive the search signal in steps 619 and 621, respectively.

In step 620, the first wireless power transmitter 601 transmits a wireless power transmitter search response signal to the wireless power receiver 603, based on the received search signal. Similarly, in step 622, the second wireless power transmitter 602 also transmits a wireless power transmitter search response signal to the wireless power receiver 603 based on the received search signal. For example, the wireless power transmitter search response signal has a data structure as shown in Table 5 below and is referred to as a response search signal hereinafter.

TABLE 5

| Frame Type | Reserved | Sequence Number | Network ID |
|---|---|---|---|
| Response Search | 4 bit | 1 Byte | 1 Byte |

In table 5, the frame type field of Table 5 indicates a type of the frame, i.e., a response search signal fame. The reserved field is reserved for future use and is allocated, for example, 4 bits. The sequence number field indicates a sequential order of the corresponding signal and is allocated, for example, 1 byte. For example, the sequence number may increase by one for each signal transmission/reception step.

The network ID field indicates a network ID of the wireless power transmitter and is allocated, for example, 1 byte.

In step 623, the wireless power receiver 603 determines the wireless power transmitter to perform the joining from the first wireless power transmitter 601 and the second wireless power transmitter 602 by comparing Received Signal Strength Indicators (RSSIs) or energy levels of the received response search signals. For example, the wireless power receiver 603 may determine the second wireless power transmitter 602 as the wireless power transmitter to perform the joining.

In step 624, the wireless power receiver 603 transmits a join request signal to the second wireless power transmitter 602. The join request signal may also be referred to as a communication request signal, because the join request signal is the signal for setting up communication between the wireless power receiver 603 and the second wireless power transmitter 602. The join request signal is referred to as a request join signal hereinafter, and may have a data structure as shown in Table 6 below.

In Table 6, the frame type field indicates a type of the frame of the signal, i.e., a request join frame. The reserved field is reserved for future use and is allocated, for example, 4 bits. The sequence number field indicates a sequential order of the corresponding signal and is allocated, for example, 1 byte. For example, the sequence number may increase by one for each signal transmission/reception step.

The network ID field indicates a network ID of the wireless power transmitter and is allocated, for example, 1 byte. The product ID field indicates product information of the wireless power receiver and includes, for example, serial number information of the wireless power receiver. The input voltage MIN field indicates a minimum voltage value applied to a front end of a DC/DC inverter (not shown) of the wireless power receiver and is allocated, for example, 1 byte. The input voltage MAX field indicates a maximum voltage value applied to the front end of the DC/DC inverter (not shown) of the wireless power receiver and is allocated, for example, 1 byte. The typical output voltage field indicates a rated voltage value applied to a rear end of the DC/DC inverter (not shown) of the wireless power receiver and is allocated, for example, 1 byte. The typical output current field indicates a rated current value flowing to the rear end of the DC/DC inverter (not shown) of the wireless power receiver and is allocated, for example, 1 byte.

The second wireless power transmitter 602 may determine whether to establish communication with the wireless power receiver based on the request join signal. First, the second wireless power transmitter 602 may determine whether to establish communication based on a signal strength of the request join signals, e.g., an RSSI value. If a received RSSI value of the request join signal is greater than a predetermined threshold, the second wireless power transmitter 602 may determine to establish communication. However, if a received RSSI value of the request join signal is not greater than the predetermined threshold, the second wireless power transmitter 602 may determine not to establish communication.

Alternatively; the second wireless power transmitter 602 may determine whether to establish communication by checking an ID of the request join signal. Although not shown in Table 6, the request join signal may further include an ID of the wireless power receiver. The second wireless power transmitter 602 may check an ID of the wireless power receiver and determine whether the ID is allowed for wireless power transmission. If the ID is allowed for the wireless power transmission, the second wireless power transmitter 602 may determine to establish communication with the wireless power receiver.

The second wireless power transmitter 602 transmits a join response signal (hereinafter, referred to as a response join signal) corresponding to the received request join signal in step 625.

For example, the response join signal has a data structure as shown in Table 7.

TABLE 6

| Frame Type | Reserved | Sequence Number | Network ID | Product ID | Input Voltage MIN | Input Voltage MAX | Typical Output Voltage | Typical Output Current |
|---|---|---|---|---|---|---|---|---|
| Request-join | 4 bit | 1 Byte | 1 Byte | 4 Byte | 1 Byte | 1 Byte | 1 Byte | 1 Byte |

TABLE 7

| Frame Type | Reserved | Sequence Number | Network ID | Permission | Session ID |
|---|---|---|---|---|---|
| Response join | 4 bit | 1 Byte | 1 Byte | 4 bit | 4 bit |

In Table 7, the frame type field indicates a type of the frame, i.e., that the corresponding fames is in a response join signal. The reserved field is reserved for future use and is allocated, for example, 4 bits. The sequence number field indicates a sequential order of the corresponding signal and is allocated, for example, 1 byte. For example, the sequence number may increase by one for each signal transmission/reception step.

The network ID field indicates a network ID of the wireless power transmitter and is allocated, for example, 1 byte. The permission field indicates whether the wireless power receiver joins a wireless power network and is allocated, for example, 4 bits. For example, when the permission field indicates 1, the wireless power receiver is allowed to join the wireless power network, and when the permission field indicates 0, the wireless power receiver is not allowed to join the wireless power network.

The session ID field indicates a session ID assigned to the wireless power receiver by the wireless power transmitter for controlling the wireless power network. The session ID is allocated, for example, 4 bits.

The second wireless power transmitter 602 determines whether to transmit charging power to the wireless power receiver 603 and transmit a result thereof to the wireless power receiver 603 by using the response join signal. Here, it is assumed that the second wireless power transmitter 602 determines to apply the charging power to the wireless power receiver 603.

In step 626, the wireless power receiver 603 transmits an Acknowledgement (Ack) signal to the second wireless power transmitter 602. In step 627, the second wireless power transmitter 602 transmits a command signal for instructing a charging initiation to the wireless power receiver 603.

For example, the command signal has a data structure as shown in Table 8.

TABLE 8

| Frame Type | Session ID | Sequence number | Network ID | Command Type | Variable |
|---|---|---|---|---|---|
| Command | 4 bit | 1 Byte | 1 Byte | 4 bit | 4 bit |

In Table 8, the frame type field indicates a type of frame, i.e., indicates that the corresponding frame is a command signal frame. The session field indicates a session ID assigned to each of the wireless power receivers by the wireless power transmitter for controlling the wireless power network. The session ID field is allocated, for example, 4 bits. The sequence number field indicates a sequential order of the corresponding signal and is allocated, for example, 1 byte. For example, the sequence number may increase by one for each a signal transmission/reception step.

The network ID field indicates a network ID of the wireless power transmitter and is allocated, for example, 1 byte. The command type field indicates a type of command and is allocated, for example, 4 bits. Further, the variable field supplements the command type field and is allocated, for example, 4 bits.

The command type field and the variable field may be used to indicate various commands as shown below in Table 9.

TABLE 9

| Command Type | Variable |
|---|---|
| Charge start | Reserved |
| Charge finish | Reserved |
| Request Report | CTL level |
| Reset | Reset type |
| Channel Scan | Reserved |
| change channel | Channel |
| load switch on | Reserved |

In Table 9, a charge start command instructs the wireless power receiver to initiate charging, a charge finish command instructs the wireless power receiver to end the charging, a request report command instructs the wireless power receiver to transmit a report signal, a reset command instructs the wireless power receiver to reset, a channel scan command instructs the wireless power receiver to search for a channel, a channel change command instructs the wireless power receiver to change a communication channel, and a load switch on command instructs the wireless power receiver to control a load switch thereof to be in an on state, e.g., immediately, or after or at a preset time.

The above-listed commands may be set independently or simultaneously. For example, the command signal may simultaneously instruct to initiate the charging and instruct to control the load switch to be in the on state.

In step 627, the second wireless power transmitter 602 initiates the charging of the wireless power receiver 603 by instructing to control the load switch to be in the on state. In step 628, the second wireless power transmitter 602 increases a power quantity to charging power 629 from the driving power 617. In step 630, the second wireless power transmitter 602 monitors whether there is a load change within a preset time period.

In step 631, the wireless power receiver 603 initiates the charging and controls the load switch to be in the on state, based on the commands received from the second wireless power transmitter 602. In step 632, the wireless power receiver 603 transmits a report signal to the second wireless power transmitter 602.

For example, the report signal has a data structure as shown in Table 10.

TABLE 10

| Frame Type | Session ID | Sequence number | Network ID | Voltage | Output Voltage | Output Current | Reserved |
|---|---|---|---|---|---|---|---|
| Report | 4 bit | 1 Byte | 1 Byte | 1 Byte | 1 Byte | 1 Byte | 1 Byte |

In Table 10, the frame type field indicates a type of frame, indicates that the corresponding frame is a report signal frame. The session field indicates a session ID assigned to each of the wireless power receivers by the wireless power transmitter for controlling the wireless power network. The session ID field is allocated, for example, 4 bits. The sequence number field indicates a sequential order of the corresponding signal and is allocated, for example, 1 byte. For example, the sequence number may increase by one for each signal transmission/reception step.

The network ID field indicates a network ID of the wireless power transmitter and is allocated, for example, 1 byte. The input voltage field indicates a voltage value applied to a front end of a DC/DC inverter (not shown) of the wireless power receiver and is allocated, for example, 1 byte. The output voltage field indicates a voltage value applied to a rear end of the DC/DC inverter (not shown) of the wireless power receiver and is allocated, for example, 1 byte. The output current field indicates a rated current value flowing to the rear end of the DC/DC inverter shown) of the wireless power receiver and is allocated, for example, 1 byte.

As described above, the wireless power receiver 603 may not actually be disposed on the second wireless power transmitter 602, i.e., the wireless power receiver 603 may actually be disposed on the first wireless power transmitter 601, and as a result, the second wireless power transmitter 602 may not detect the load change within a preset time (Tloadon), in step 633. Accordingly, the second wireless power transmitter 602 excludes the wireless power receiver 603 from the wireless power network controlled by the second wireless power transmitter 602. That is, the wireless power transmitter 602 may decide not to communicate with the wireless power receiver 603, and then returns to a load change detection state.

However, when another wireless power receiver, instead of the wireless power receiver 603, joins the wireless power network controlled by the second wireless power transmitter 602, the second wireless power transmitter 602 only stops applying the charging power to the wireless power receiver 603 and continues to charge the another wireless power receiver, without returning to the load change detection state. In FIG. 6, it is assumed that the second wireless power transmitter 602 returns to the load change detection state.

Accordingly, the first wireless power transmitter 601 and the second wireless power transmitter 602 apply detection power 634 and 635, respectively. The wireless power receiver 603 is continuously disposed on the first wireless power transmitter 601. Accordingly, the first wireless power transmitter 601 and the second wireless power transmitter 602 apply driving power 636 and 637, respectively. In step 638, the wireless power receiver 603 is driven based on the driving power 636 and 637. The wireless power receiver 603 transmits a search signal to the first wireless power transmitter 601 and the second wireless power transmitter 602 in steps 639 and 640, respectively.

In step 641, the first wireless power transmitter 601 transmits a response search signal to the wireless power receiver 603 in response to the search signal. Because the second wireless power transmitter 602 has excluded the wireless power receiver 603 from the wireless power network controlled by the second wireless power transmitter 602, the search signal from the wireless power receiver 603 may be ignored for a preset period (tignore). For example, the second wireless power transmitter 602 may exclude the wireless power receiver 603 from the wireless power network by storing an ID or a serial number of the wireless power receiver 603 and ignoring the search signal transmitted from the corresponding wireless power receiver 603.

In step 642, the wireless power receiver 603 forms a communication with the first wireless power transmitter 601 according to the received response search signal.

In step 643, the wireless power receiver 603 transmits a request join signal to the first wireless power transmitter 601, and in step 644, the first wireless power transmitter 601 transmits a response join signal to the wireless power receiver 603. In step 645, the wireless power receiver 603 transmits an Ack signal to the first wireless power transmitter 601.

In step 646, the first wireless power transmitter 601 initiates the charging and control the on state of the load switch at a particular point in time by using a command signal. In step 647, the first wireless power transmitter 601 increases applied power to charging power 652 from driving power 637.

In step 648, the first wireless power transmitter 601 monitors for a load change.

Both the first wireless power transmitter 601 and the wireless power receiver 603 may use a command signal or an Ack signal as a synchronization signal for calculating the predetermined time Tloadon. For example, a point in time of receiving the command signal or the Ack signal may be used as a point in time to start calculating the predetermined time Tloadon.

In step 649, the wireless power receiver 603 initiates the charging and also controls the load switch to be in the on state after a preset time (Tloadon).

In step 650, the wireless power receiver 603 transmits the report signal to the first wireless power transmitter 601.

In step 651, the first wireless power transmitter 601 detects a load change due to an on state control of the load switch, after a preset time (Tloadon). Accordingly, the first wireless power transmitter 601 determines that the wireless power receiver 603 is disposed on the first wireless power transmitter 601 and continues to charge. The first wireless power transmitter 601 may set up a tolerance for the predetermined time Tloadon. The first power transmitter 601 may continue to charge even though the first power transmitter 601 detects a load change earlier than the predetermined time Tloadon or later than the predetermined time Tloadon.

Figure 7A:
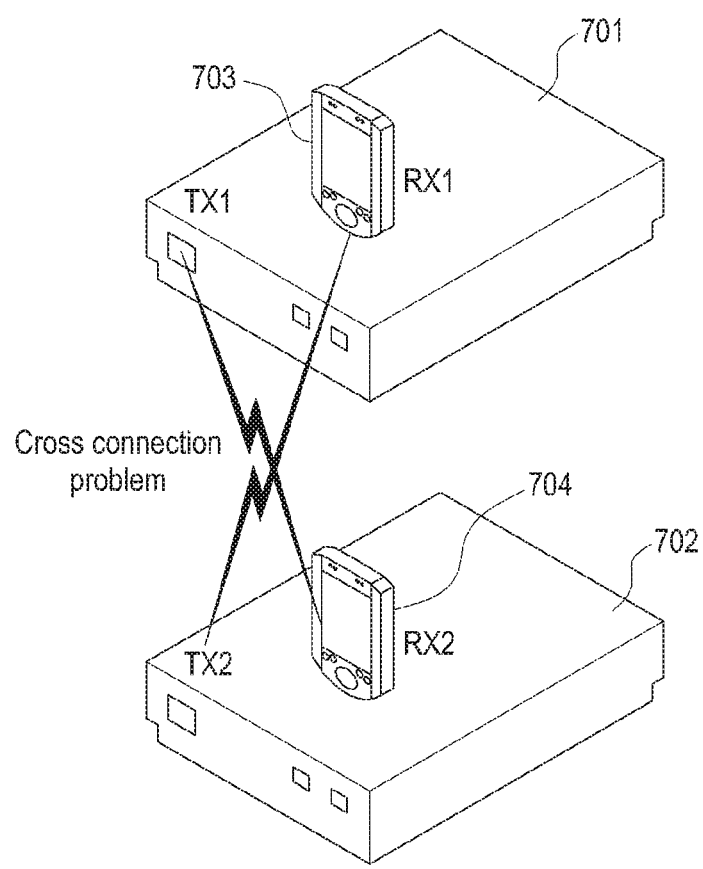
FIG. 7A illustrates a cross-connection scenario.

FIG. 7A illustrates a cross-connection scenario.

Referring to FIG. 7A, a first wireless power receiver 703 is disposed on a first wireless power transmitter 701, and a second wireless power receiver 704 is disposed on a second wireless power transmitter 702. However, the first wireless power transmitter 701 is communicating with the second wireless power receiver 704, and the second wireless power transmitter 702 is communicating with the first wireless power receiver 703.

Figure 7B:
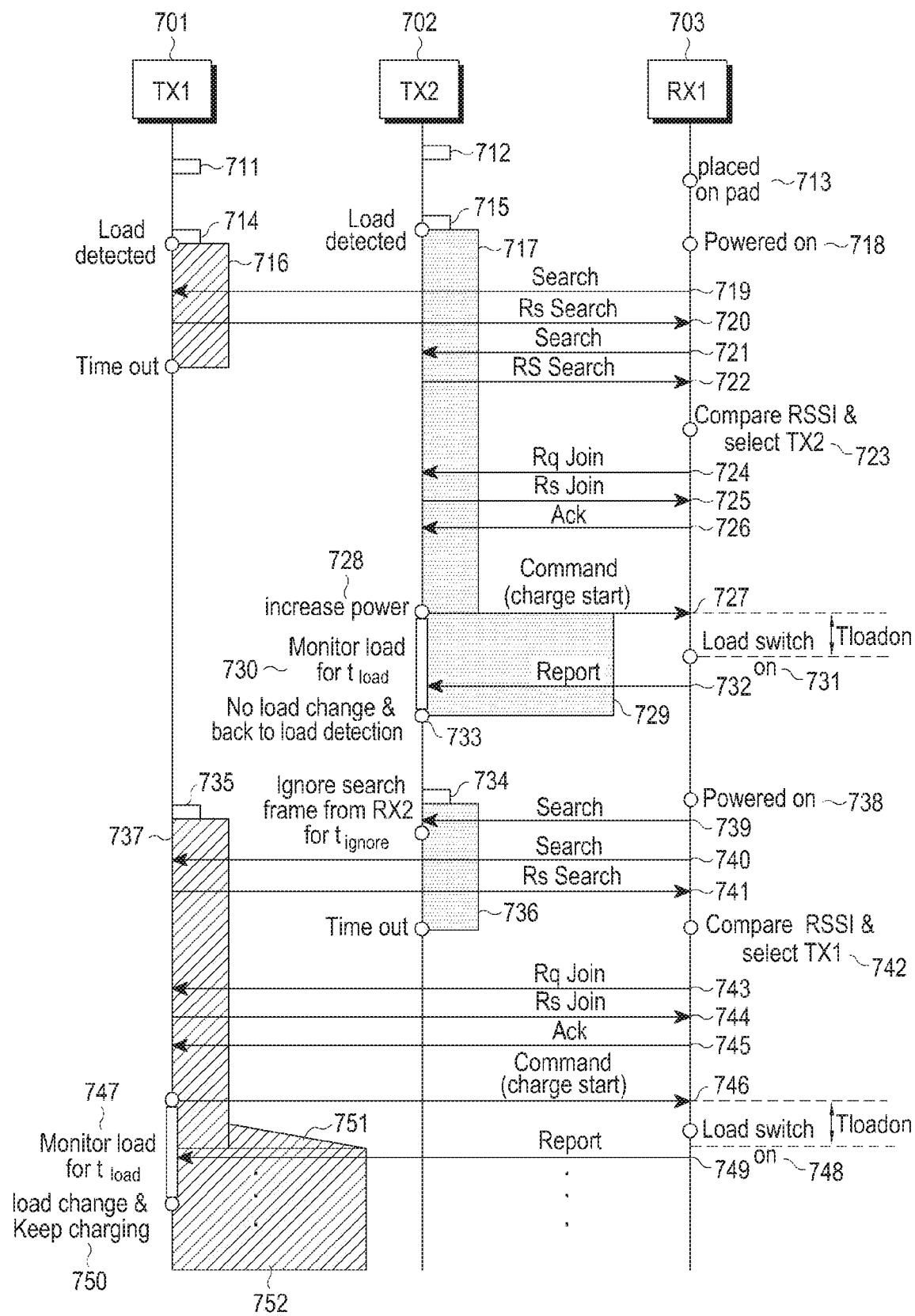
FIG. 7B is a signal flow diagram illustrating a charging process according to an embodiment of the present invention.

FIG. 7B is a signal flow diagram illustrating a charging process according to an embodiment of the present invention. Specifically, FIG. 7B illustrates a procedure for addressing the problems created by the scenario illustrated in FIG. 7A.

In FIG. 7B, steps 711 to 745 are the same as steps 611 to 645 as illustrated in FIG. 6, and thus repetitive descriptions of these steps will be omitted here.

Referring to FIG. 7B, in step 746, the first wireless power transmitter 701 instructs the wireless power receiver 703 to initiate charging and controls an on state of the load switch at a particular tune point by using a command signal. In step 747, the first wireless power transmitter 701 monitors for a load change, after a preset time (tloadon).

In step 748, the wireless power receiver 703 controls the load switch to be in the on state after the preset time (tloadon), and in step 749, the wireless power receiver 703 transmits a report signal to the first wireless power transmitter 701.

In step 750, the first wireless power transmitter 701 continues applying charging power 752, after gradually increasing charging power in step 751.

Figure 8A:
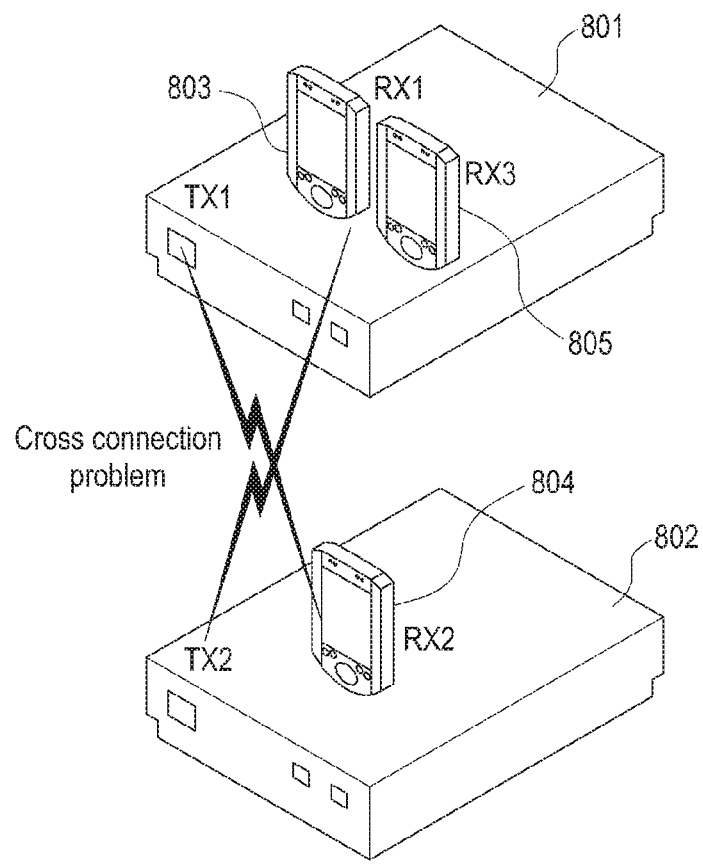
FIG. 8A illustrates a cross-connection scenario.

FIG. 8A illustrates a cross-connection scenario.

Referring to FIG. 8A, a first wireless power receiver 803 and a third wireless power receiver 805 are disposed on a first wireless power transmitter 801, and a second wireless power receiver 804 is disposed on a second wireless power transmitter 802. However, the first wireless power transmitter 801 communicates with the second wireless power receiver 804, and the second wireless power transmitter 802 communicates with the first wireless power receiver 803 and the third wireless power receiver 805. For example, the third wireless power receiver 805 was disposed on the first wireless power transmitter 801, after the first wireless power receiver 803.

Figure 8B:
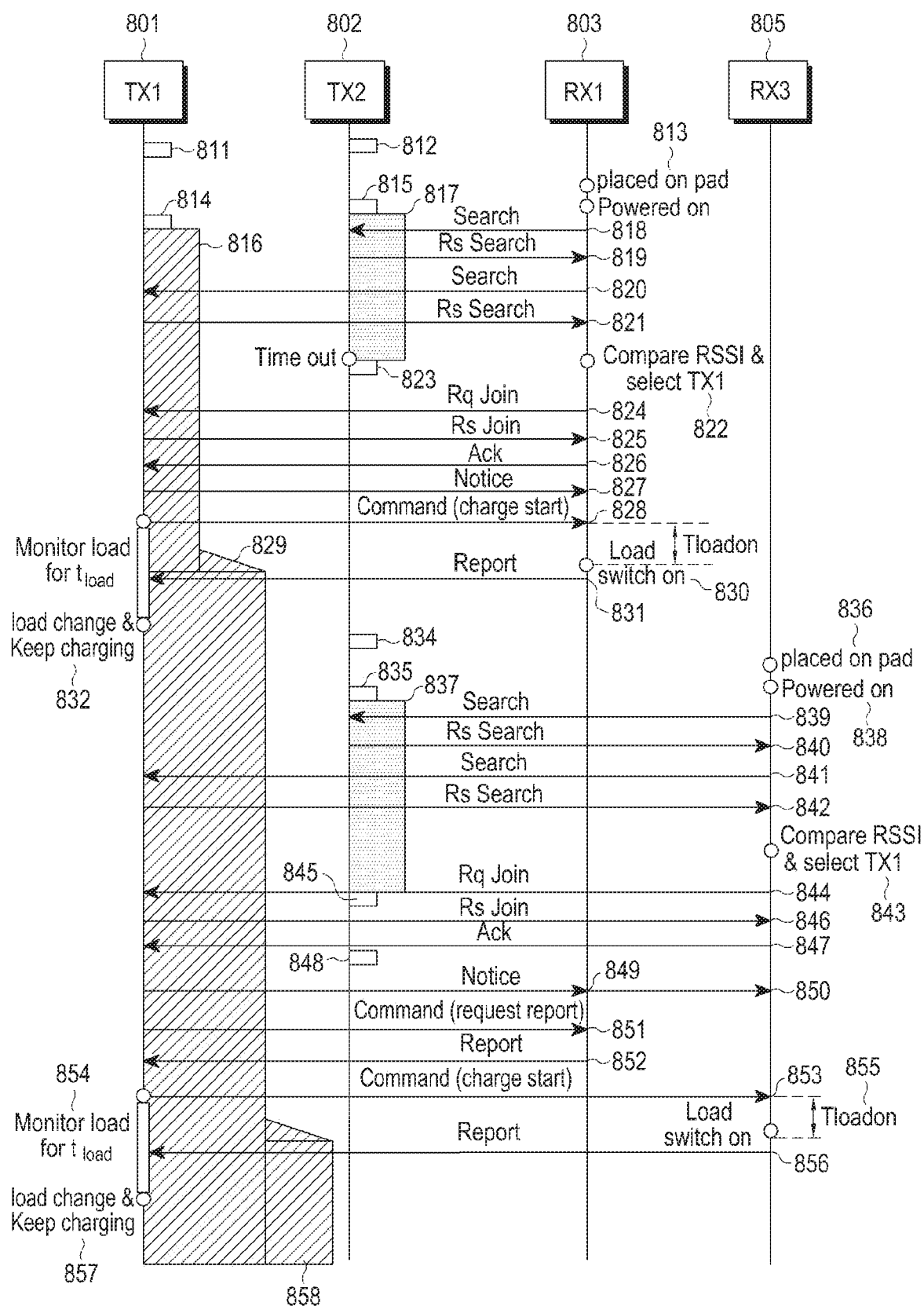
FIG. 8B is a signal flow diagram illustrating a charging process according to an embodiment of the present invention.

FIG. 8B is a signal flow diagram illustrating a charging process according to an embodiment of the present invention. Specifically, FIG. 8B illustrates transmission and reception between the wireless power transmitter and the wireless power receivers in the scenario illustrates in FIG. 8A.

Referring to FIG. 8B, the first wireless power transmitter 801 periodically or aperiodically applies detection power 811 and 814 for detecting the first wireless power receiver 803. The second wireless power transmitter 802 periodically or aperiodically applies detection power 812 and 815 for detecting the first wireless power receiver 803. The detection power is power applied for detecting the first wireless power receiver 803 by the first wireless power transmitter 801 or the second wireless power transmitter 802. As described above, when the first wireless power receiver 803 is disposed on one of the wireless power transmitters, a load or impedance at one point of the first wireless power transmitter and the second wireless power transmitter may be changed. The first wireless power transmitter 801 or the second wireless power transmitter 802 detects a load change at one point based on detection power while applying the corresponding detection power. In FIG. 8B, the user disposes the first wireless power receiver 803 on the first wireless power transmitter 801 in step 813.

The first wireless power transmitter 801 detects the load change during a process of applying the detection power 814. The first wireless power transmitter 801 stops applying the detection power 814 and applies driving power 816. The second wireless power transmitter 802 detects the load change during a process of applying the detection power 815. The second wireless power transmitter 802 stops applying the detection power 815 and applies driving power 817.

In step 818, the first wireless power receiver 803 transmits a search signal as shown in Table 1 based on the applied driving power 816 or 817. For example, the first wireless power receiver 803 may transmit the search signal based on a multicast or a broadcast technique. Accordingly, both the first wireless power transmitter 801 and the second wireless power transmitter 802 receive the search signal in steps 818 and 820.

In step 821, the first wireless power transmitter 801 transmits a wireless power transmitter search response signal to the first wireless power receiver 803, based on the received search signal. In step 819, the second wireless power transmitter 802 also transmits the wireless power transmitter search response signal to the first wireless power receiver 803, based on the received search signal.

In step 822, the first wireless power receiver 803 determines the first wireless power transmitter 801 as a wireless power transmitter to perform joining, based on an RSSI or an energy level of the received response search signal. The second wireless power transmitter transmits detecting power 823.

In step 824, the first wireless power receiver 803 transmits a request join signal to the first wireless power transmitter 801. In step 825, the first wireless power transmitter 801 transmits a response join signal to the first wireless power receiver 803, and in step 826, the first wireless power receiver 803 transmits an Ack signal to the first wireless power transmitter 801.

In step 827, the first wireless power transmitter 801 transmits a notice signal to the first wireless power receiver 801, and in step 828, initiates the charging and controls an on state of the load switch at a particular point in time by using a command signal.

The first wireless power transmitter 801 monitors for a load change after a preset time (tloadon), and in step 829, increases a power quantity applied to charging power, when the load change due to an on state 830 of the load switch of the first wireless power receiver 803 is detected.

In step 831, the wireless power receiver 803 transmits a report signal to the first wireless power transmitter 801. The first wireless power transmitter 801 maintains applying charging power 832 after gradually increasing the charging power 829.

The second wireless power transmitter 802 may periodically apply detection power 834 and 835.

In step 836, the third wireless power receiver 805 is disposed on the first wireless power transmitter 801 between applying of the detection power 834 and applying of the detection power 835. In step 838, the second wireless power transmitter 802 applies driving power 837 and the third wireless power receiver 805 turns on.

In step 8339, the third wireless power receiver 805 transmits a search signal to the second wireless power transmitter 802, and in step 840, the second wireless power transmitter 802 transmits a response search signal to the third wireless power receiver 805.

In step 841, the third wireless power receiver 805 transmits the search signal to the first wireless power transmitter 801, and in step 842, the first wireless power transmitter 801 transmits the response search signal to the third wireless power receiver 805.

In step 843, the third wireless power receiver 805 determines the first wireless power transmitter 801 as a wireless power transmitter to perform joining by comparing RSSIs or energy levels of the response search signals received from the first wireless power transmitter 801 and the second wireless power transmitter 802.

In step 844, the third wireless power receiver 805 transmits a request join signal to the first wireless power transmitter 801, and in step 846, the first wireless power transmitter 801 transmits a response join signal to the third wireless power receiver 805.

In step 847, the third wireless power receiver 805 transmits an Ack signal to the first wireless power transmitter 801, and the second wireless power transmitter 802 periodically applies detection power 845 and 848.

In step 849, the first wireless power transmitter 801 defines a new period by transmitting a notice signal to the first wireless power transmitter 803. In step 850, the notice signal transmitted from the first wireless power transmitter 801 is also received by the third wireless power receiver 805.

In step 850, the first wireless power transmitter 801 transmits a report signal instructing the first wireless power receiver 803 to report a charging state. In response to the report signal, in step 852, the first wireless power receiver 803 transmits a report signal including information such as a charging state, impedance information, remaining charging amount, etc.

In step 853, the first wireless power transmitter 801 initiates the charging and controls an on state of the load switch at a particular point in time by using a command signal.

In step 854, the first wireless power transmitter 801 monitors a load change, and detects the load change by a load switch on after a preset time 855.

In step 856, the third wireless power receiver 803 transmits the report signal.

In step 857, the first wireless power transmitter 801 having detected the load change maintains charging power, which has been gradually increased at step 858.

As described above, when two or more wireless power receivers are disposed, preventing cross-connection is possible.

Figure 9:
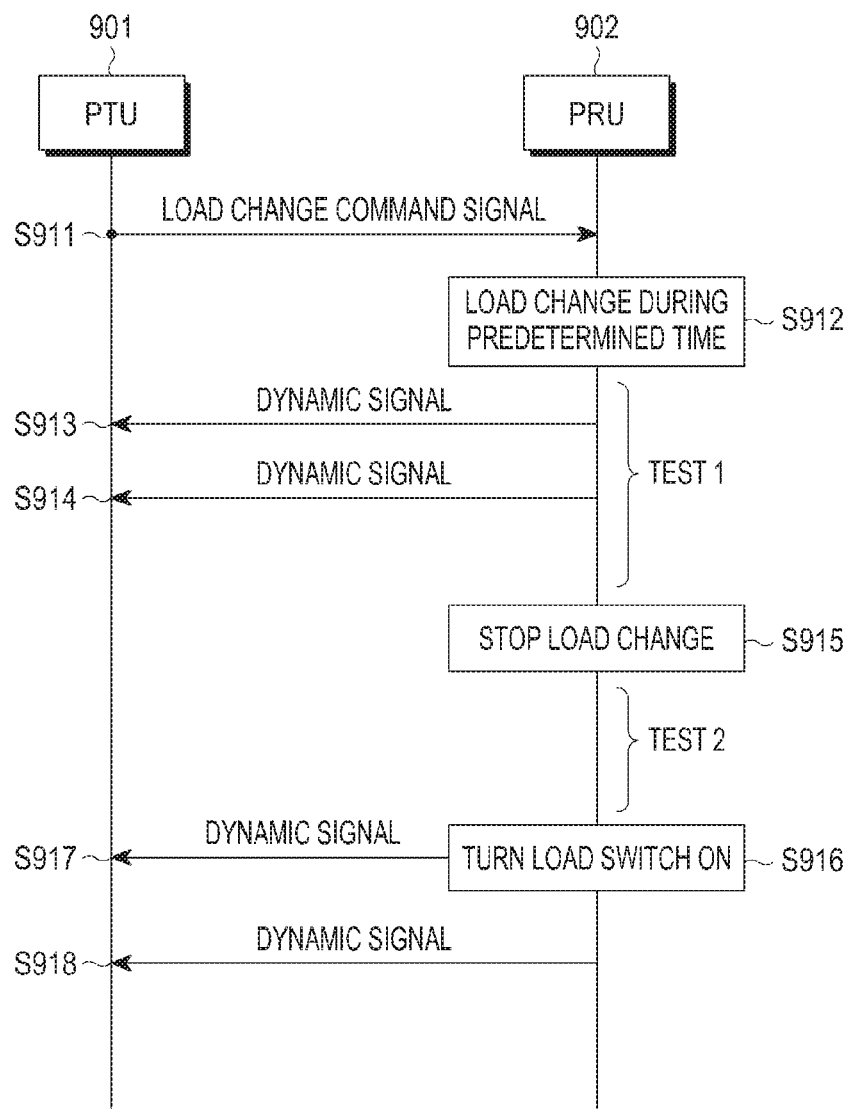
FIG. 9 is a signal flow diagram illustrating signaling between a wireless power transmitter and a wireless power receiver, according to an embodiment of the present disclosure.

FIG. 9 is a signal flow diagram illustrating signaling between a wireless power transmitter and a wireless power receiver, according to an embodiment of the present disclosure.

Referring to FIG. 9, a wireless power transmitter 901 transmits a load change command signal to a wireless power receiver 902 in step S911. The load change command signal may be a signal for the wireless power receiver 902 to change a load during a first period of time (Tset1) and to control a load switch to be in the off state during a second period of time (Tset2). Alternatively, the load change command signal may be a signal to request a load change during the first period of time Tset1. For example, the load change may be a change of the load switch from off state to on state. For example, changing the load during the first period of time may be to change the load switch from off state to on state and remain the load switch in the on state for the first period of time Tset1.

Alternatively, changing the load during the first period of time may be changing the load according to a predetermined pattern during the first period of time Tset1.

In step S912, the wireless power receiver 902 changes the load during the predetermined first period of time Tset1, based on the received load change command signal. For example, the wireless power receiver 902 may change the load switch from off state to on state and remain the load switch to be in the on state during the first period of time Tset1. Alternatively, the wireless power receiver 902 may change the load according to a predetermined pattern during the first period of time Tset1.

The wireless power receiver 902 transmits dynamic signals to the wireless power transmitter 901 at predetermined intervals in steps S913, S914, S917, and S918.

The wireless power receiver 902 stops changing the load after the lapse of the first period of time Tset1 in step S915. For example, the wireless power receiver 902 may control the load switch having been in the on state during the first period of time Tset1 to be in off state. Alternatively, the wireless power receiver 902 may stop changing the load according to the predetermined pattern.

When the load change command signal includes a command to control the load switch to be in off state during the second period of time Tset2, the wireless power receiver 902 changes the load switch to be in on state after remaining the load switch in off state during the second period of time Tset2 in step S916. However, if the load change command signal includes only a command to change the load during the first period of time Tset1, the aforementioned step of controlling the load switch to be in off state during the second period of time Tset2 may be omitted.

The wireless power transmitter 901 may detect a load change of the wireless power receiver 902. The wireless power transmitter 901 may compare information of the transmitted load change command signal to the detected load change, and determine from the comparison whether the wireless power receiver is cross-connected. For example, the wireless power transmitter 901 may detect a load change during the first period of time Tset1 and detect the load switch being off during the second period of time Tset2. That is, if it is determined that the load change detected by the wireless power transmitter 901 corresponds to the information of the load change command signal, the wireless power transmitter 901 determines that the wireless power receiver 902 is a wireless power receiver for charging, which is not cross-connected. However, if the load change detected by the wireless power transmitter 901 does not correspond to the information of the load change command signal, the wireless power transmitter 901 determines that the wireless power receiver 902 is a cross-connected wireless power receiver.

If the load change command signal indicates only a load change during the first period of time Tset1, the wireless power transmitter 901 may determine that the wireless power receiver is a wireless power receiver for charging, which is not cross-connected, upon detection of a load change during the first period of time Tset1. However, if the load change detected by the wireless power transmitter 901 does not correspond to the information of the load change command signal, the wireless power transmitter 901 may determine that the wireless power receiver 902 is a cross-connected wireless power receiver.

In accordance with another embodiment of the present invention, the wireless power receiver 902 may send a control signal (for example, a load change signal) including the first period of time Tset1 and/or second period of time Tset2 to the wireless power transmitter 901. The control signal indicates that the wireless power receiver 902 changes a load during the first period of time Tset1 and changes a load switch into off state during the second period of time Tset2. Alternatively, the control signal may indicate that the wireless power receiver 902 changes a load during the first period of time Tset1. For example, the load change may be a change of the load switch from off state to on state. Further, changing the load during the first period of time may be to change the load switch from off state to on state and remain the load switch in the on state for the first period of time Tset1. Alternatively, changing the load during the first period of time may change the load according to a predetermined pattern during the first period of time Tset1.

The wireless power receiver 902 may change the load during the predetermined first period of time Tset1 based on the control signal. For example, the wireless power receiver 902 may change the load switch from off state to on state and remain the load switch to be in the on state during the first period of time Tset1. Alternatively, the wireless power receiver 902 may change the load according to a predetermined pattern during the first period of time Tset1.

The wireless power receiver 902 may also stop changing the load after the lapse of the first period of time Tset1. For example, the wireless power receiver 902 may control the load switch having been in the on state during the first period of time Tset1 to be in off state. Alternatively, the wireless power receiver 902 may stop changing the load according to the predetermined pattern.

If the load change signal includes information to control the load switch to be in off state during the second period of time Tset2, the wireless power receiver 902 may change the load switch to be in on state after remaining the load switch in off state during the second period of time Tset2. However, if the load change signal includes only a command to change the load during the first period of time Tset1, the aforementioned step of controlling the load switch to be in off state during the second period of time Tset2 may be omitted.

The wireless power transmitter 901 may receive the control signal from the wireless power receiver 902 and detect a load change of the wireless power receiver 902.

The wireless power transmitter 901 may compare information of the received control signal (e.g., load change signal) to the detected load change, and determine from the comparison whether the wireless power receiver is cross-connected. For example, the wireless power transmitter 901 may detect a load change during the first period of time Tset1 and detect the load switch being off during the second period of time Tset2. In other words, if it is determined that the load change detected by the wireless power transmitter 901 matches to the information of the control signal, the wireless power transmitter 901 may determine that the wireless power receiver 902 is a wireless power receiver for charging, which is not cross-connected. On the other hand, if it is determined that the load change detected ley the wireless power transmitter 901 does not match to the information of the load change signal, the wireless power transmitter 901 may determine that the wireless power receiver 902 is a cross-connected wireless power receiver.

If the load change signal indicates only a load change during the first period of time Tset1, the wireless power transmitter 901 may determine that the wireless power receiver is a wireless power receiver for charging, which is not cross-connected, upon detection of a load change during the first period of time Tset1. On the other hand, if it is determined that the load change detected by the wireless power transmitter 901 does not match to the information of the load change signal, the wireless power transmitter 901 may determine that the wireless power receiver 902 is a cross-connected wireless power receiver.

In accordance with an embodiment of the present invention, the information about a load change, first period of time, second period of time, etc., transmitted by the wireless power transmitter 901 or the wireless power receiver 902, may be included as static parameters or dynamic parameters in any signal of many signals sent during a registration procedure or a charging procedure about the wireless power receiver 902.

According to the above-described various embodiments of the present invention, it is possible to address many of the problems associated with a wireless power receiver located on a wireless power transmitter connected to another wireless power transmitter and receiving charging power.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for controlling a wireless power transmitter, the method comprising:
   transmitting to a first wireless power receiver, a control signal including time information;
   detecting that a load is changed;
   identifying whether a period of time for which the changed load is maintained corresponds to the time information;
   based on identifying that the period of time does not correspond to the time information, determining that the first wireless power receiver is cross-connected;
   receiving a search signal from the first wireless power receiver, after determining that the first wireless power receiver is cross-connected; and
   storing identifier (ID) information of the first wireless power receiver which causes the wireless power transmitter to not respond to the search signal from the first wireless power receiver for a preset period.

2. The method of claim 1, further comprising:
   receiving another search signal from the first wireless power receiver, after the preset period is lapsed,
   upon lapse of the preset period, transmitting a search response corresponding to the another search signal to the first wireless power receiver.

3. The method of claim 1, further comprising:
   identifying the identifier information of the first wireless power receiver included in another search signal which is received before the preset period is lapsed, and
   comparing the stored identifier information and the identifier information included in the another search signal, and
   refraining from transmitting a search response based on the comparison result.

4. The method of claim 1, further comprising:
   receiving another search signal from a second wireless power receiver, and
   based on determining that the second wireless power receiver is not cross-connected, transmitting a search response corresponding to the another search signal to the second wireless power receiver.

5. The method of claim 1, wherein the control signal further comprises information to instruct to change a state of a load switch of the first wireless power receiver from an off state to an on state and to maintain the on state during the period of time corresponding to the time information.

6. The method of claim 1, further comprising:
   after a lapse of the period of time corresponding to the time information, identifying whether the load is changed to an original value.

7. The method of claim 6, further comprising determining that the first wireless power receiver is not cross-connected, in response to identifying that the load is changed, the period of time for which the changed load is maintained corresponds to the time information and the load is changed to the original value after lapse of the period of time corresponding to the time information.

8. The method of claim 7, further comprising:
   based on determining that the first wireless power receiver is not cross-connected, providing a charging power for charging the first wireless power receiver.

9. A wireless power transmitter comprising:
   a power transmitting unit configured to wirelessly transmit power;

a communication unit; and
a controller configured to:
control the communication unit to transmit to a first wireless power receiver, a control signal including time information,
detect that a load is changed,
identify whether a period of time for which the changed load is maintained corresponds to the time information,
based on identifying that the period of time does not correspond to the time information, determine that the first wireless power receiver is cross-connected,
control the communication unit to receive a search signal from the first wireless power receiver, after determining that the first wireless power receiver is cross- connected, and
store identifier (ID) information of the first wireless power receiver for causing the wireless power transmitter to not respond to the search signal from the first wireless power receiver for a preset period.

10. The wireless power transmitter of claim 9, wherein the controller is configured to:
control the communication unit to receive another search signal from the first wireless power receiver, after the preset period is lapsed,
upon lapse of the preset period, control the communication unit to transmit a search response corresponding to the another search signal to the first wireless power receiver.

11. The wireless power transmitter of claim 9, wherein the controller is configured to:
identify the identifier information of the first wireless power receiver included in another search signal which is received before the preset period is lapsed, and
compare the stored identifier information and the identifier information included in the another search signal, and
refrain from transmitting a search response based on the comparison result.

12. The wireless power transmitter of claim 9, wherein the controller is configured to:
control the communication unit to receive another search signal from a second wireless power receiver, and
based on determining that the second wireless power receiver is not cross-connected, control the communication unit to transmit a search response corresponding to the another search signal to the second wireless power receiver.

13. The wireless power transmitter of claim 9, wherein the control signal further comprises information to instruct to change a state of a load switch of the first wireless power receiver from an off state to an on state and to maintain the on state during the period of time corresponding to the time information.

14. The wireless power transmitter of claim 9, wherein the controller is configured to:
after a lapse of the period of time corresponding to the time information, identify whether the load is changed to an original value.

15. The wireless power transmitter of claim 14, wherein the controller is configured to determine that the first wireless power receiver is not cross-connected, in response to identifying that the load is changed, the period of time for which the changed load is maintained corresponds to the time information and the load is changed to the original value after lapse of the period of time corresponding to the time information.

16. The wireless power transmitter of claim 15, wherein the controller is configured to:
based on determining that the first wireless power receiver is not cross-connected, provide, through the power transmitting unit, a charging power for charging the first wireless power receiver.

* * * * *